Jan. 25, 1966　　　C. E. MATTHEWS　　　3,230,773
MICROSCOPE COLD STAGE
Filed April 20, 1962

INVENTOR.
CLAYTON E. MATTHEWS
BY
Arthur H. Seidel
ATTORNEY 3,230,773
MICROSCOPE COLD STAGE
Clayton E. Matthews, Chalfont, Pa., assignor to Arthur H. Thomas Company, Philadelphia, Pa., a corporation of Pennsylvania
Filed Apr. 20, 1962, Ser. No. 189,191
8 Claims. (Cl. 73—362)

In general, this invention relates to a new and improved microscope cold stage and more particularly to a microscope cold stage which utilizes thermoelectric elements.

A cold stage is a device which permits the determination of melting or freezing points of chemical crystalline substances while under microscopic observation at below ambient temperatures.

Heretofore, these have consisted primarily of an enclosed chamber so constructed as to permit passage of a cooled gas through the chamber which in turn froze a substance contained therein. The bottom of the chamber was formed by a glass slide, coated with an electrically resistant material which could be heated by passage of an electric current through the coating. The sample, on a suitable carrier rested on this glass slide. After the sample was frozen by the passage of cooled gas through the chamber a conductive slide was heated and the sample melted. The temperature of melting was determined by a liquid in glass thermometer, the bulb of which was in the gas filled chamber and in proximity to the sample on the heat producing slide.

This construction involved inherent difficulties which rendered doubtful the accuracy of the melting points determined in this fashion. First the response of the thermometer was slow due to the large mass involved. Secondly the sensing bulb of the thermometer was not directly attached to the surface being measured and was subject to variations in the flow rate of the gas. At best, the thermometer was measuring the average environmental temperature in the chamber. This was not necessarily the sample temperature.

It is a general object of this invention to avoid and overcome the foregoing and other difficulties of and objections to the prior art practices by the provision of a better and more accurate microscope cold stage.

It is another object of the present invention to provide a better microscope cold stage utilizing thermoelectric elements.

It is another object of the present invention to provide a better microscope cold stage which allows the direct determination of the sample temperature.

It is another object of the present invention to provide a simple and better microscope cold stage in which observation of the sample may be made with either substage illumination or illumination from above.

It is still another object of the present invention to provide a better microscope cold stage having a chamber for placing a sample to be studied therein in which it is not necessary to provide a dehydrating agent in the chamber.

It is still another object of the present invention to provide a better thermoelectric microscope cold stage for use with transmitted light wherein there is no optical interference of the light path of the microscope.

Other objects will appear hereinafter.

For the purpose of illustrating the invention there is shown in the drawings a form which is presently preferred; it being understood, however, that this invention is not limited to the precise arrangements and instrumentalities shown.

Figure 1:
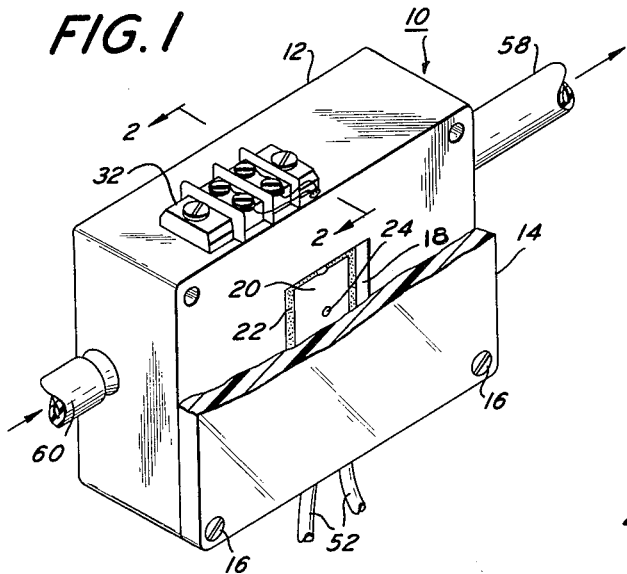
FIGURE 1 is a perspective view of a microscope cold stage manufactured in accordance with the principles of the present invention with its cover partially removed.
Figure 2:
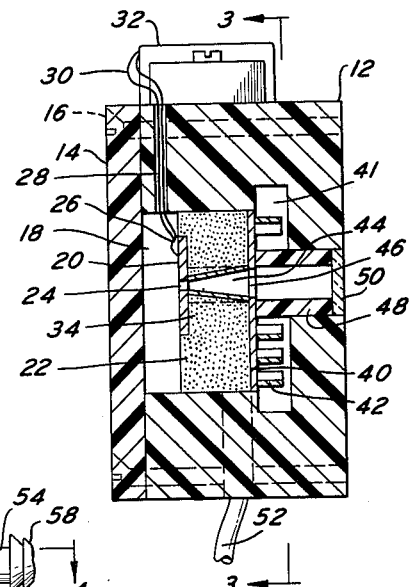
FIGURE 2 is a sectional view of the embodiment shown in FIGURE 1 taken along the lines 2—2.
Figure 3:
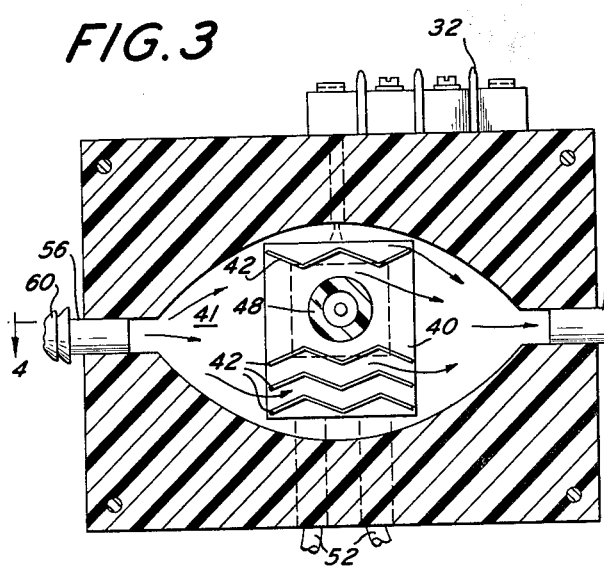
FIGURE 3 is a sectional view of the microscope cold stage of the present invention taken along the lines 3—3 of FIGURE 2.
Figure 4:
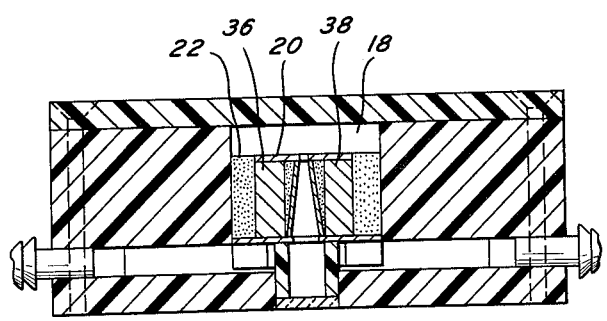
FIGURE 4 is a sectional view of the microscope cold stage of the present invention taken along the lines 4—4 in FIGURE 3.

The microscope cold stage of the present invention is generally designated by the numeral 10.

The microscope cold stage 10 consists of a bottom main body portion 12 having a cover 14 secured by screws 16 to the main body 12. The cover 14 and the main body 12 are preferably made of a plastic material of low thermal conductivity. The cover 14 should be a transparent optically plane piece of plastic for reasons which will be discussed below.

A recess 18 in the side of the main body 12 adjacent the cover 14 is adapted to be utilized as the sample chamber. The bottom wall of the recess 18 is formed by a cold plate 20 of the thermocouple 34. A potting compound 22 encapsulates the thermocouple 34 in foamed polystyrene (filled with Freon) for thermal isolation of the cold plate 20 from the hot plate 40. A hole 24 is drilled through the center of the cold plate 20 and is in communication with a hole 44 drilled through the thermocouple 34 and a hole 46 drilled through the hot plate 42.

A thermistor 26 is soldered to the top surface of the cold plate 20 with Woods alloy so as not to ruin the thermoelectric element 34 or the thermistor 26 with excessive heat from soldering. The thermistor's leads are run out through a hole in the body 12 to a strain relieving cinch block 32 which is fastened to the lead side of the stage with screws. One lead of the thermistor may have a short piece of tubing slipped thereover to eliminate possible short circuits. The thermistor leads 30 may be connected to a meter (not shown) of the Wheatstone bridge type, or any other suitable resistance measuring device. The thermistor itself is a negative resistance element and will lower its resistivity with increases in temperature and vice versa.

The hot plate 40 of the thermocouple 34 has W-shaped cooling fins 42. These cooling fins extend from the hot plate into a cooling chamber 41.

A tube 48 is adapted to pass through the bottom wall of the body 12 so as to be aligned with the hole 46 in the hot plate 40. The tube 48 passes through the cooling chamber 41. A cover plate 50 covers the end of the tube 48 opposite the hole 46.

The inner diameter of the tube 48 is preferably made larger than the hole 24 in the cold plate 20. In one embodiment, the diameter of the tube 48 was 5 mm. while the hole 24 was only 2 mm. in diameter.

The cooling chamber 41 is connected to opposite sides of the main body 12 through conduits 54 and 56. The conduits 54 and 56 have bushings 58 and 60 respectively connected thereto. The bushings 58 and 60 are connected across a cooling fluid supply such as a water pump (not shown). Water flows through the bushing 60 and conduit 56 to the chamber 41. The water flows around the cooling fins 42 and the tube 48 to cool the plate 40. Thence, it flows out through the conduit 54 and the brushing 58.

The thermocouple 34 is one such as the model TA–11 manufactured by Ohio Semiconductors, Inc. of Columbus, Ohio. It consists of two junctions. Two crystals 36 and 38 of N- and P-type bismuth telluride alloys are used in the TA–11 unit. However, any other type of thermoelectric module might be used within the scope of this invention. A sample module might contain more than one thermoelectric couple in thermal cascade and electrically in series with their lowest cold ends soldered to the cold plate and their hot ends soldered to the heat sink plate. The thermoelectric element 34 is connected through leads 52 to a suitable source of direct current.

In one embodiment of the present invention utilizing a three couple thermoelectric module and operating on a direct current input of 30 amperes at 2.6 volts a lowering of the temperature of a sample in the chamber was achieved. The temperature of the sample was −50° C. below that of the cooling liquid in the chamber 41. The cooling liquid had a temperature of +20° C.

The operation of the microscope cold stage of the present invention is as follows:

First the cover 14 is removed and a sample of a chemical substance whose crystalline structure is to be observed is placed on a very thin microscope cover glass and inserted into the recess 18. The microscope cover glass is in intimate contact, over its entire area, with the cooled metal plate 20. The cover 14 is then screwed to the main body 12 closing the chamber 18. The cold chamber 18 is thermally insulated from ambient temperatures and is of an extremely small volume. Thus, it provides a low thermal load for the thermoelectric module 34. The cover plate 50 over the end of the tube 48 insures thermal insulation through the opening including holes 24, 44 and 46. This allows a high degree of cooling with minimum power input.

The cold stage is then placed on a microscope with the hole 24 in line with the axis of the microscope. When this is so illumination from above will allow one to see the chemical substance in the chamber 18 through the transparent plexiglass cover 14. In the alternative, if substage lighting is utilized the light rays will pass through the transparent cover 50, tube 48, holes 44 and 24 to the chamber 18. It should be noted at this time that the tube 48 prevents turbulence in the cooling liquid from effecting the optical light path.

The bushings 58 and 60 are then connected to the cooling liquid source to cool the heat sink 40. The terminals on the strain relieving electrical connector 32 are utilized to connect the thermistor wires 30 to a suitable meter.

The thermoelectric module 34 is then connected to a source of direct current by means of wires 52. The thermoelectric module 34 cools the sample in the chamber 18 to its freezing point. By looking through the microscope the user can determine the changes in the crystalline structure at the exact moment of freezing. Since the thermistor is soldered to the edge of the cold plate 20 to provide good thermal contact with the cold plate, it will give an exact measurement of the temperature of the cold plate. The chemical substance in the chamber having been placed on a very thin microscope cover glass which is in intimate contact over its entire area with the cooled plate 20 will be at the same temperature as the plate 20.

The chamber is draft free and therefore the thermistor will not err due to the flow of gas in the chamber. The sample can be cooled at varying rates by variation in the current furnished to the thermoelectric module 34 or warmed by reversal of polarity of the current to observe the melting point of the chemical substance.

The present invention may be embodied in other specific forms without departing from the spirit or essential attributes thereof and, accordingly, reference should be made to the appended claims, rather than to the foregoing specification as indicating the scope of the invention.

I claim:

1. A microscope cold stage comprising a main body of thermally insulated material having a chamber of small volume in relation to a test specimen therein, a thermally conducting plate on one wall of the chamber, said plate having a substantially smaller surface area than said body, means thermally isolating the plate from said body, thermoelectric means for controlling the temperature of said plate, a heat sink, said thermoelectric means being coupled to said heat sink and said plate, and a temperature sensing means in thermal conductive relation with said plate for measuring the temperature of said plate.

2. A microscope cold stage in accordance with claim 1 including a fluid flow chamber in said body, means defining an inlet and an outlet to said fluid flow chamber, and at least a portion of one wall of said fluid flow chamber being defined by said heat sink.

3. A microscope cold stage in accordance with claim 2 including an annular member extending through said fluid flow chamber, means defining a hole through said heat sink and plate in line with said annular member to allow light passage therethrough.

4. A microscope cold stage comprising a main body of thermally insulated material having a chamber therein, a thermally conducting plate on one wall of the chamber, thermoelectric means for controlling the temperature of said plate, and a temperature sensing means in thermal conductive relation with said plate for measuring the temperature of said plate, said body having a hole therethrough, said hole passing through the thermally conducting plate to form an optical light path, said thermoelectric means including at least one thermocouple with one end connected to said thermally conducting plate and its other end connected to a heat sink, said heat sink being in a fluid flow chamber to cool said other end of said thermocouple, and said hole also passing through said thermocouple, heat sink and the fluid flow chamber.

5. A microscope cold stage in accordance with claim 4 wherein a solid annular member is placed in said fluid flow chamber in line with said hole so as to allow light passage through said hole without interference from the fluid in said fluid flow chamber.

6. A microscope cold stage in accordance with claim 4 wherein said first-mentioned chamber has one open end, and includes a transparent cover of thermally insulated material adapted to be placed over said open end to close said first-mentioned chamber.

7. A microscope cold stage in accordance with claim 6 wherein the end of the hole in said body opposite the thermally conducting plate is covered with a transparent thermally insulated material to thermally insulate said fluid flow chamber.

8. A microscope cold stage in accordance with claim 4 wherein the end of the hole in said body opposite the thermally conducting plate is of a greater diameter than the hole in the thermally conducting plate.

References Cited by the Examiner

UNITED STATES PATENTS

| | | | |
|---|---|---|---|
| 2,232,354 | 2/1941 | Weygand | 88—40 |
| 3,017,444 | 9/1960 | Fritts | 136—4.2 |
| 3,017,522 | 1/1962 | Lubcke | 307—88.5 |
| 3,018,631 | 1/1962 | Bury et al. | 136—4.2 |
| 3,076,339 | 2/1963 | Barton | 73—362 |

FOREIGN PATENTS

| | | |
|---|---|---|
| 881,575 | 11/1961 | Great Britain. |
| 884,570 | 12/1961 | Great Britain. |

OTHER REFERENCES

Temperature, Its Measurement and Control in Science and Industry (American Institute of Physics) published by Reinhold Publishing Corporation (Scranton, Pa.), pages 673–681 relied on.

Publication: Cascading of Peltier Couples for Thermoelectric Cooling. Journal of Applied Physics, vol. 27, No. 7, July 1956, pages 820–823.

ISAAC LISANN, *Primary Examiner.*